US012627625B1

(12) United States Patent (10) Patent No.: US 12,627,625 B1
Nafde et al. (45) Date of Patent: May 12, 2026

(54) DYNAMIC LINKING BACKEND GRAPH NODES FOR COMMUNICATION SESSION REPRESENTATION

(71) Applicant: Amazon Technologies, Inc., Seattle, WA (US)

(72) Inventors: Rahul Ajay Nafde, Lynnwood, WA (US); Pawel Boguszewski, Edmonds, WA (US); Hitesh Kathuria, Bothell, WA (US); Shivi Verma, Santa Clara, CA (US); Sachin Shahurao Chitale, Redmond, WA (US); Sharon Holmes, San Diego, CA (US); Charles Salmon, Seattle, WA (US); Thayn Moore, Bothell, WA (US); Joseph Sullivan, Seattle, WA (US); Anshul Arun Agrawal, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 18/345,747

(22) Filed: Jun. 30, 2023

(51) Int. Cl.
*H04L 51/216* (2022.01)
(52) U.S. Cl.
CPC .................................. *H04L 51/216* (2022.05)

(58) Field of Classification Search
CPC .................................................... H04L 51/216
See application file for complete search history.

(56) References Cited

U.S. PATENT DOCUMENTS

| | | | | |
|---|---|---|---|---|
| 11,093,125 | B1* | 8/2021 | van Doorn .......... | G06F 3/04842 |
| 2016/0028891 | A1* | 1/2016 | Pirat ..................... | H04L 65/403 |
| | | | | 379/265.09 |
| 2018/0336569 | A1* | 11/2018 | Ritchie ................... | H04L 51/58 |
| 2019/0220154 | A1* | 7/2019 | Muramoto .......... | G06F 3/04886 |
| 2022/0285609 | A1* | 9/2022 | Huang ................... | H10N 50/10 |
| 2022/0385609 | A1* | 12/2022 | Hassan ................. | H04L 51/214 |
| 2023/0064851 | A1* | 3/2023 | Shu .................... | G06Q 10/1093 |

* cited by examiner

*Primary Examiner* — Caroline H Jahnige
(74) *Attorney, Agent, or Firm* — Knobbe, Martens, Olson & Bear, LLP

(57) ABSTRACT

In a communication session, users start a chat, leave the conversation, and return later to continue chatting. The system enables dynamic linking of electronic conversations that may be out of chronological order. The system projects transcripts from earlier occurring conversations as a single long running communication session. The system uses graphs and immutable nodes to model a chain of conversations to recreate the long running communication session. Users resume previous conversations with the context, metadata, and transcripts carried forward. Users do not need to repeat themselves when they return to a chat and agents have access to the entire conversation history and metadata.

16 Claims, 9 Drawing Sheets

300

Interaction: I1
Initial Interaction: N/A

Interaction: I2
Initial Interaction: I1

Interaction: I3
Initial Interaction: I1

Interaction: I4
Initial Interaction: I1

302

304

306

308

I1

I2

I3

I4

Time

310

DYNAMIC LINKING BACKEND GRAPH NODES FOR COMMUNICATION SESSION REPRESENTATION

BACKGROUND

In a chat context, database retrieval can be used to retrieve and present messages. Typically, series of chat messages between two users are stored in a database. A chat message can have a sender, a recipient, and a timestamp. During a chat conversation between two users, a user can navigate in a user interface to view previous messages between the users. The system can retrieve messages between the two users in a reverse chronological order based on the time-stamps. However, such systems lack several functions, such as, but not limited to, the ability to link previous conversations out of chronological order and the ability to link previous conversations from different users.

In other chat contexts, a user can communicate with an agent. In some existing chat solutions, a user can drop in and out of the electronic conversation. When a user returns to an agent chat session there are a lot of different potential interactions with which the user could be presented. If a user is presented their most recent user-agent chat session, such a presentation may not be the most relevant to the issue at hand.

BRIEF DESCRIPTION OF THE DRAWINGS

These and other features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
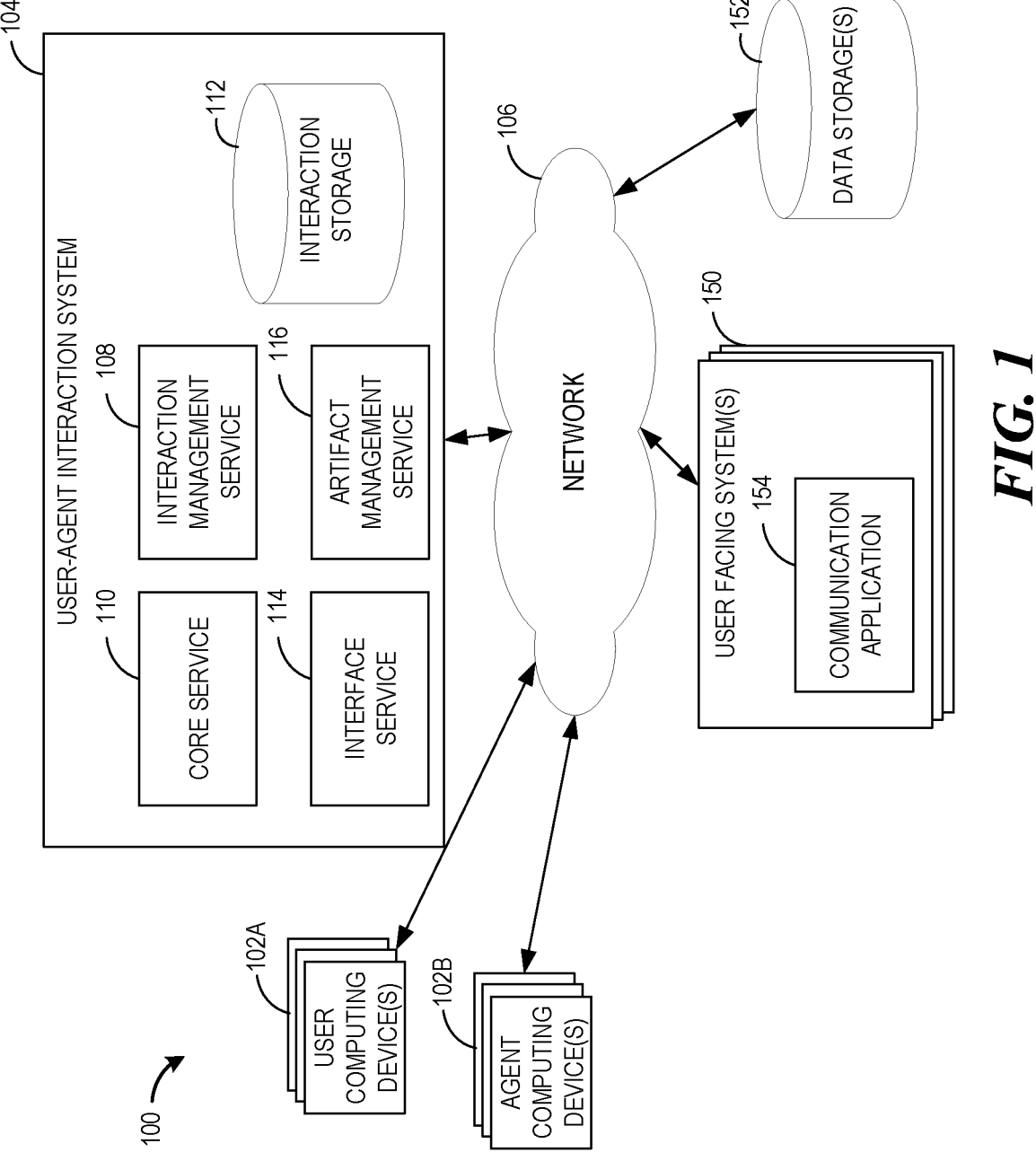
FIG. 1 is a schematic block diagram depicting an illustrative network environment for implementing a user-agent interaction system.

Generally described, aspects of the present disclosure are directed to improved linking and retrieving of electronic communications between at least two users, such as between a customer and a customer service agent. As described above, electronic message database retrieval typically involves retrieving electronic messages between user profiles in reverse chronological order and by timestamp. These systems do not allow linking of electronic messages out of chronological order and/or do not allow linking of electronic messages that can be from different agent profiles. As described herein, out of chronological order can mean that two interactions, e.g., between a user and an agent, can be directly linked where there may be intermediary interactions that occurred between the two interactions but that are omitted from the linked interactions. An improved system can allow dynamic linking of backend interaction nodes, which can be out of chronological order, that can enable a seamless presentation of transcripts between user profiles and agent profiles. The backend system can maintain multiple discrete transcripts for each interaction. As a user reviews their conversation history (such as by navigating in the graphical user interface), the backend system can dynamically identify previous interactions and associated transcripts and load those transcripts for presentation to the user such that the user perceives a continuous transcript. From an agent perspective, when a user returns, the agent can view the entire conversation history and associated metadata. The system can support loading any previous interaction and transcript, and linking a current interaction with any previous interaction. The system can receive a request to link an interaction with any previous interaction among multiple different previous interactions. The system can also support linking interactions and transcripts from different communication channels, such as linking voice and chat interactions and their corresponding transcripts into a continuous experience. With a persistent communication session, users can resume previous conversations with the context, metadata, and transcripts carried forward. Users may not need to repeat themselves when they return to a communication session and agents have access to the entire conversation history and context.

The systems and methods described herein may improve computer performance. Some existing systems can load transcripts on demand. As a user or agent requests previous interactions and transcripts, the system dynamically loads previous interactions and transcripts. A user can have a history of interactions that span years. Therefore, instead of loading every conversation a user ever had every time the user begins a conversation, the system can instead load linked interactions and transcripts as they are needed, thereby improving computer performance and using less computing resources, such as, but not limited to, computer processors and memory. Therefore, the systems and methods described herein can improve the operation of a computer by using less computing resources while simultaneously providing relevant linked transcripts.

As used herein, the term "interaction" can refer to data representing a unit of contact between two entities, such as contact between the user and an agent of the organization. An interaction can represent a contact via any communication means between a user and an agent, which can eventually be presented in a text-based format. For example, a user and an agent may speak verbally, over the phone or in a virtual meeting, and the contents of the conversation, such as a transcription of the conversation, can be presented to the user and/or the agent in a messaging user interface, such as, a chat user interface. The agent can be an automated agent, such as an agent that requests survey answers from a user. Each interaction can be associated with a transcript and/or metadata (such as a document shared during a chat session).

An initial interaction can be linked with a second interaction. The second interaction can be linked with a third interaction and so forth. The linked interactions can form a graph data structure. As described herein, an interaction can be linked with two or more interactions. Moreover, an interaction can be linked with a pervious interaction at any time. In some embodiments, interactions can be individual messages between a user and an agent. In some embodiments, an interaction can be specified via timestamps or other indicators with respect to a transcript.

As used herein, the term "communication session" can refer to the exchange of messages between two entities. Current communication sessions can be the live exchange of messages between a user profile and an agent profile that is presented. A previous communication session can be a past exchange of messages that is presented, such as a transcript. A previous communication session can be a session where a user profile exited the interaction and/or a time threshold has been satisfied since a last message was sent.

Turning to FIG. 1, an illustrative network environment 100 is shown in which a user-agent interaction system 104 may process communication requests and manage interactions between a user and an agent in order to produce a seamless presentation of a transcript between a user profile and an agent profile. As will be described in more detail below, the components of the network environment 100 can enable dynamic linking of interactions between the user and agent that are out of chronological order in conjunction with causing the presentation. The network environment 100 may include one or more user computing devices 102A, the user-agent interaction system 104, a user facing system 150, one or more data storages 152, and one or more agent computing devices 102B. As described herein, the user facing system 150 can determine which interactions to link and the user-agent interaction system can link those interactions. Accordingly, the text associated with the interactions can be presented in the user computing devices 102A and the agent computing devices 102B as linked.

The user-agent interaction system 104 may include an interface service 114, a core service 110, an interaction management service 108, an artifact management service 116, and an interaction storage 112. The user facing system 150 may include a communication application 154. The constituents of the network environment 100 may be in communication with each other either locally or over a network 106. While certain constituents of the network environment 100 are depicted as being in communication with one another, any constituent of the network environment 100 can communicate with any other constituent of the network environment 100; however, not all of these communication lines are depicted in FIG. 1. For example, any of the interaction management service 108, the artifact management service 116, the core service 110, and the interface service 114 can communicate directly with each other.

The user facing system 150 can be the system that allows users using the user computing devices 102A to interact with agents using the agent computing devices 102B. In some embodiments, users of the user facing system 150 may communicate with an agent, such as a customer service agent, via the communication application 154. Example communications can include, but are not limited to, spoken communication and/or written communication, such as, but not limited to, chat, spoken conversations, text messages, and/or email. The user facing system 150 can provide a messaging user interface. The messaging user interface can include transcripts from multiple communication channels, such as a first transcript of a voice conversation and a second transcript of a text-based messaging conversation. Accordingly, communications between users and agents can occur, without limitation, verbally or over email, text message, and/or chat. User computing devices 102A and agent computing devices 102B can include, but are not limited to, a laptop or tablet computer, personal computer, personal digital assistant (PDA), hybrid PDA/mobile phone, smart wearable device (such as a smart watch), mobile phone, and/or a smartphone.

The user-agent interaction system 104 can be an interface and manager for interactions. As an interface, the user-agent interaction system 104 can receive and respond to requests from the user facing system 150. As a manager, the user-agent interaction system 104 can take actions in response to receiving the requests, such as, but not limited to, linking interactions, retrieving transcripts, and carrying out backend actions to enable the foregoing. The user-agent interaction system 104 can receive a request from the user facing system 150 to begin a conversation on behalf of the user computing device 102A.

The interface service 114 can be responsible for providing an outward facing interface to external systems, such as the user facing system 150. The interface service 114 can provide an application programming interface (API) that allows external systems to submit requests, such as, but not limited to, a request to create an interaction, a request to link interactions, a request for a transcript, etc. By providing an API via the interface service 114, user facing systems 150 can advantageously delegate the responsibility for managing interactions to the user-agent interaction system 104. The interface service 114 can receive the request to begin a conversation on behalf of the user computing device 102A. In some embodiments, the request can include a specific interaction identifier.

The core service can operate as a central hub to other services in the user-agent interaction system. Requests that are received by the interface service 114 can be provided to the core service 110. The core service 110 can coordinate between other services to ensure the creation, linking, and overall management of interactions. The core service 110 can create an interaction via the interaction management service 108. The interaction management service 108 can be responsible for operations associated with interactions, such as, but not limited to, creating interactions and linking interactions. The interaction management service 108 can use the interaction storage 112 as a repository for interactions, which can store interactions information and the links between the interactions. The core service 110 can determine one or more previous interactions associated with the created interaction. The core service 110 can receive interactions and metadata associated with the interactions from the interaction storage 112.

The artifact management service 116 can be responsible for managing locations of transcripts. As described herein, since the user-agent interaction system 104 advantageously allows dynamic linking of interactions, the user-agent interaction system 104 can locate the transcripts associated with the interactions to cause their presentation to user computing device(s) 102A and agent computing device(s) 102B. The core service 110 can request the artifact management service 116 to provide one or more transcript locations associated with the created interaction if present. The core service 110 can request one or more previous transcripts from the one or more data storages 152. The interface service 114 can provide one or more previous transcripts and/or supplemental data items to the user facing system 150.

As described herein, the interaction storage 112 can be a repository for interactions and links between the interactions. The interaction storage 112 can thus enable linking of electronic messages out of chronological order, linking of electronic messages that can be from different agent profiles, and a means of persistence for the foregoing. As described herein, the data storage 112 can be a repository for transcripts and/or supplemental data items. In some embodiments, there can be different data storages 152, which can be included in different user facing systems 150 and/or be associated with different communication modalities. Therefore, different data storages 112 can enable the user-agent interaction system 104 to integrate with multiple channels and provide a continuous transcript experience across different modalities. The interaction storage 112 and/or the data storage 152 may be embodied in hard disk drives, solid state memories, or any other type of non-transitory computer readable storage medium. The interaction storage 112 and/or the data storage 152 may also be distributed or partitioned across multiple local and/or remote storage devices. The interaction storage 112 and/or the data storage 152 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

The user computing devices 102A, the agent computing devices 102B, the user-agent interaction system 104, and/or the user facing system 150 may each be embodied in a plurality of devices. Each of the user computing device 102A, the agent computing device 102B, the user-agent interaction system 104, and/or the user facing system 150 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program (a.k.a., computer-executable) instructions that the hardware processor executes in order to operate the user computing device 102A, the agent computing device 102B, the user-agent interaction system 104, and/or the user facing system 150. The memory generally includes RAM, ROM, and/or other persistent and/or auxiliary non-transitory computer readable storage media.

Additionally, in some embodiments, the user-agent interaction system 104 and/or the user facing system 150 or components thereof are implemented by one or more virtual machines implemented in a hosted computing environment.

The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
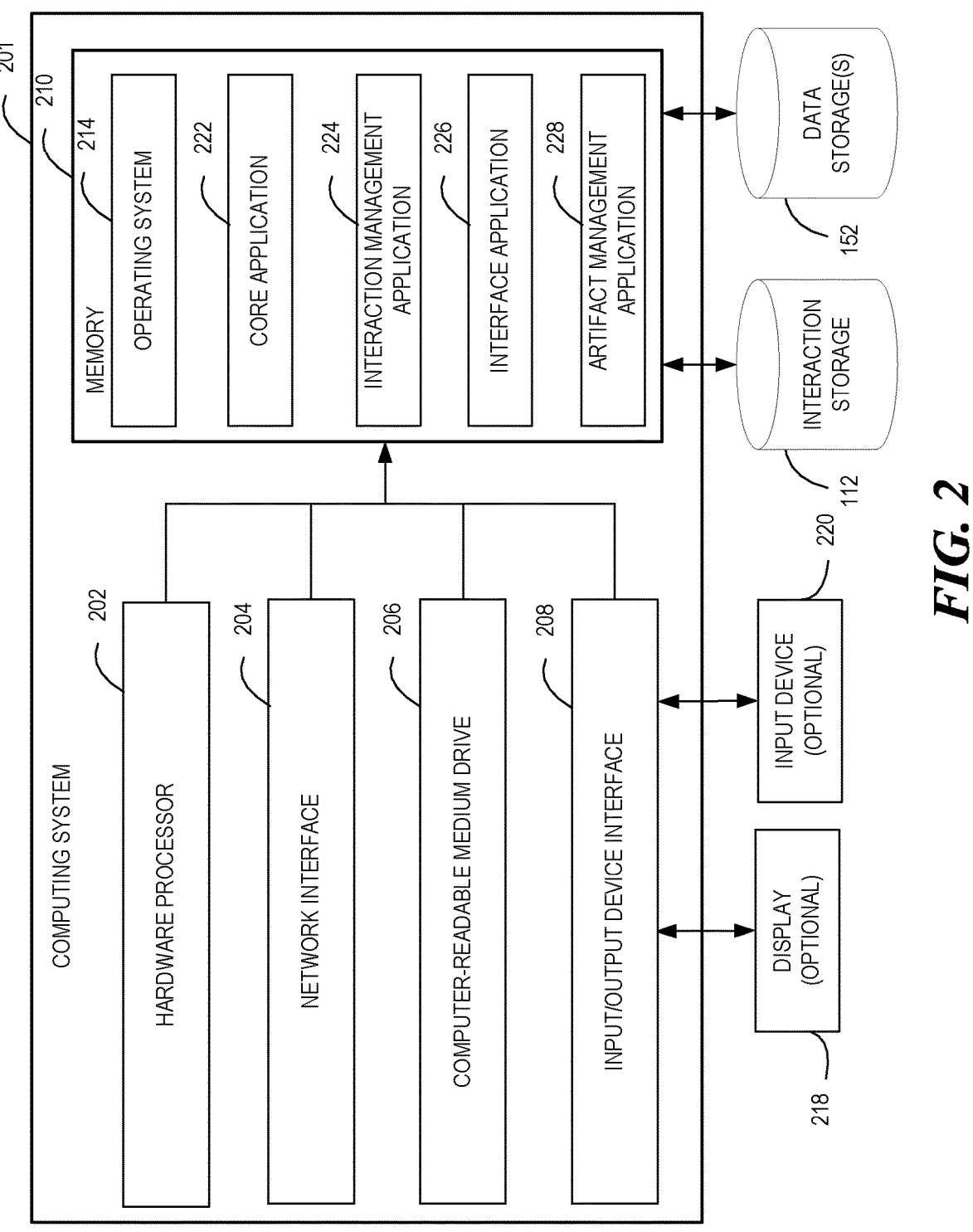
FIG. 2 is a schematic block diagram depicting an illustrative general architecture of a computing system for implementing the user-agent interaction system referenced in the network environment depicted in FIG. 1.

FIG. 2 is a schematic diagram of an illustrative general architecture of a computing system 201 for implementing a computing device within the user-agent interaction system 104 and/or the user facing system 150 referenced in the environment 100 in FIG. 1. The computing system 201 includes an arrangement of computer hardware and software components that may be used to execute the core application 222, the interaction management application 224, the interface application 226, and/or the artifact management application 228. In some embodiments, the arrangement of the core application 222, the interaction management application 224, the interface application 226, and/or the artifact management application 228 in the computing system 201 can enable the dynamic linking of interactions and the continuous presentation of transcripts, as described herein. The general architecture of FIG. 2 can be used to implement other devices described herein, such as the user computing device 102A and/or the agent computing device 102B referenced in FIG. 1. The computing system 201 may include more (or fewer) components than those shown in FIG. 2. Further, other computing systems described herein may include similar implementation arrangements of computer hardware and/or software components.

The computing system 201 for implementing a device within the user-agent interaction system 104 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the user-agent interaction system 104. The memory 210 generally includes RAM, ROM and/or other persistent or non-transitory computer-readable storage media. The memory 210 may store an operating system 214 that provides computer program instructions for use by the hardware processor 202 in the general administration and operation of the device within the user-agent interaction system 104.

The memory 210 may include a core application 222, an interaction management application 224, an interface application 226, and/or an artifact management application 228 that may be executed by the hardware processor 202. In some embodiments, the core application 222, the interaction management application 24, the interface application 226, and/or the artifact management application 228 may implement various aspects of the present disclosure. In some embodiments, the interface application 226 can implement the interface service 114 of FIG. 1. As such, the interface application 226 can receive requests to create interaction and link interactions. The interface application 226 can communicate with the user facing system 150. The core application 222 can implement the core service 110 of FIG. 1. As such, the core application 222 can act as a central hub for processing requests, such as but not limited to, requests to create interactions and dynamically link interactions. The interaction management application 224 can implement the interaction management service 108. As such, the interaction management application 224 can create interactions and link interactions. The interaction management application 224 can store interactions and interaction links in the interaction storage 112. The artifact management application 228 can implement the artifact management service 116 of FIG. 1. As such, the artifact management application 228 can retrieve the locations of artifacts associated with interactions, such as the transcripts. The core application 222 can retrieve transcripts from the data storages 152. As described herein, the core application 222 can thus provide previous transcripts for linked interactions and cause the presentation of continuous transcripts for a seamless user-agent experience.

Figure 3:
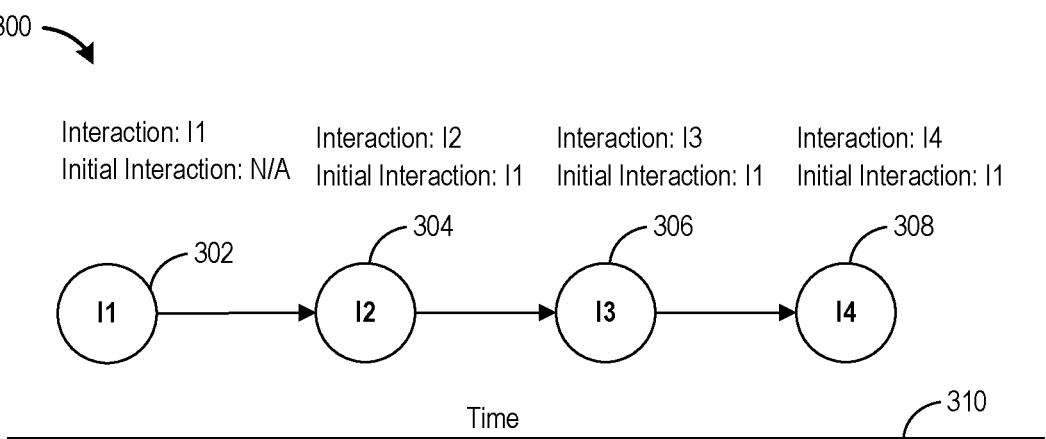
FIG. 3 is a schematic diagram depicting an interaction model used in some systems.

FIG. 3 is a schematic diagram depicting an interaction model 300 used in some prior systems that did not allow dynamic linking between interactions out of chronological order. The interaction model 300 includes a first interaction 302, a second interaction 304, a third interaction 306, and a fourth interaction 308. As described herein, each of the first interaction 302, the second interaction 304, the third interaction 306, and the fourth interaction 308 can represent a unit of contact between a user and an agent. If, during a conversation, a user is transferred to a different agent, a new interaction can be created and the previous interaction and the new interaction can be linked together. As illustrated, the first interaction 302 can be linked to the second interaction 304, the second interaction 304 can be linked to the third interaction 306, and the third interaction 306 can be linked to the fourth interaction 308. In the interaction model 300, each of the second interaction 304, the third interaction 306, and the fourth interaction 308 can be associated with the initial interaction 302. The timeline 310 can indicate an approximate time and/or order when the interactions 302, 304, 306, 308 occurred.

Figure 4:
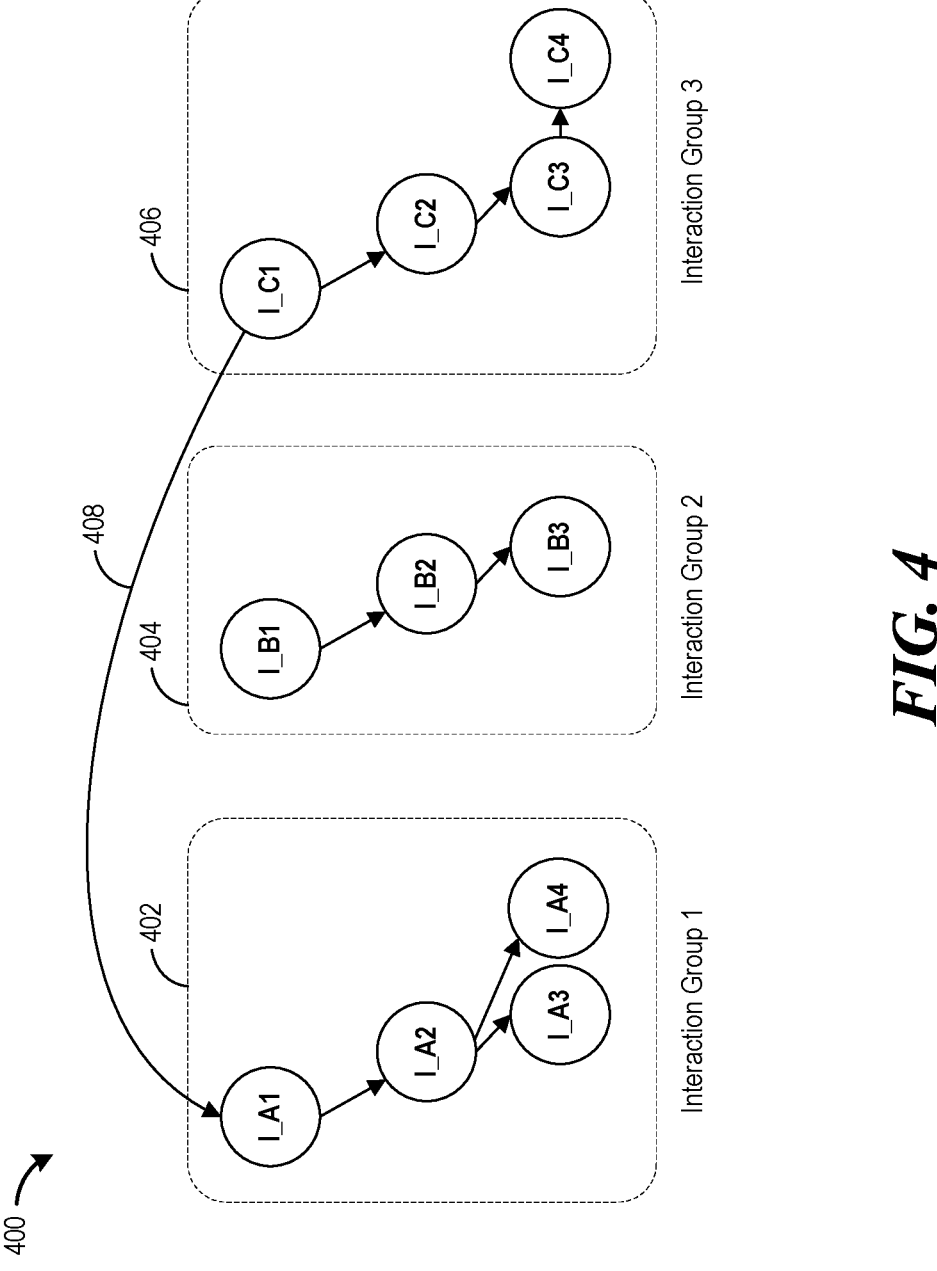
FIG. 4 is a schematic diagram depicting an improved interaction model.

FIG. 4 is a schematic diagram depicting an improved interaction model 400 that can be used by the user-agent interaction system 104. The improved interaction model 400 can advantageously allow dynamic linking between interactions out of chronological order. As described herein, some prior systems could link interactions, but they were always linked in chronological order. The improved interaction model 400 can allow direct linking of interactions where, from a chronological perspective, there were intermediary interactions, but those intermediary interactions can be omitted from the graph. Moreover, the improved interaction model 400 can allow linking of interactions after the interactions were created and their corresponding conversations have ended.

The improved interaction model 400 can be a directed graph. The direction of the edges can indicate that one node is previous to another node. The improved interaction model 400 includes a first interaction group 402, a second interaction group 404, and a third interaction group 406. As shown, each of the interaction groups 402, 404, 406 can include multiple interactions. The link 408 can be added between the "I_C1" interaction in the third interaction group 406 and the "I_A1" interaction in the first interaction group 402. As depicted, the node "I_C1" in the third interaction group 406 can be a prior interaction to the node "I_A1" in the first interaction group 402 due to the direction of the link between node "I_C1" and node "I_A1". In some embodiments, the link 408 can be added at any time. Moreover, while the link 408 can be added between the "I_C1" interaction in the third interaction group 406 and the "I_A1" interaction in the first interaction group 402, there may be some interactions that occurred in the time between the "I_C1" and the "I_A1" interactions that are omitted from that particular graph. Also as shown, multiple interactions "I_A3" and "I_A4" can be associated with the same prior interaction "I_A2". In some embodiments, the nodes in the first interaction group 402, the second interaction group 404, and the third interaction group 406 can be immutable. As described herein, the improved interaction model 400 can advantageously support multiple prior linked interactions. Accordingly, the improved interaction model 400 and techniques described herein can provide a "never ending" communication experience that overcomes the technical limitations of some prior systems, such as the systems that use the interaction model 300 of FIG. 3.

Figure 5A:
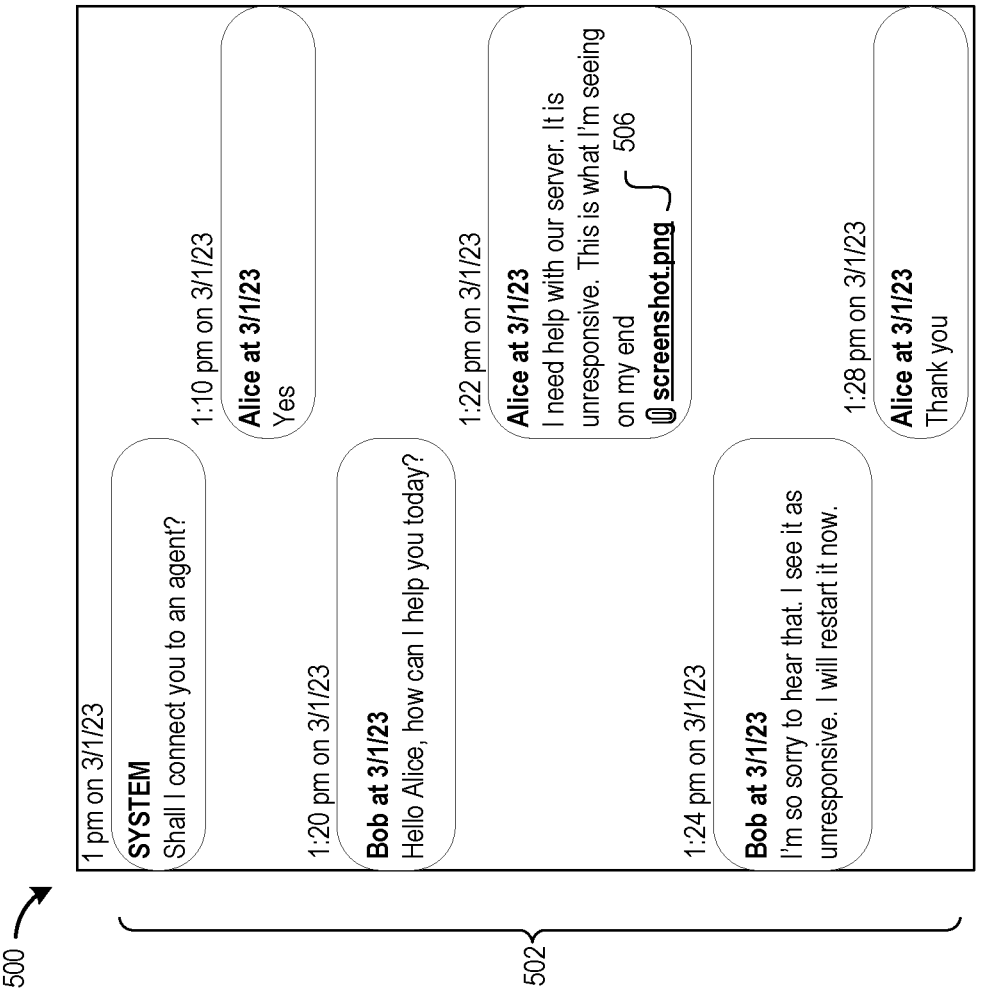
FIGS. 5A-5C depict illustrative communication graphical user interfaces.
Figure 5B:
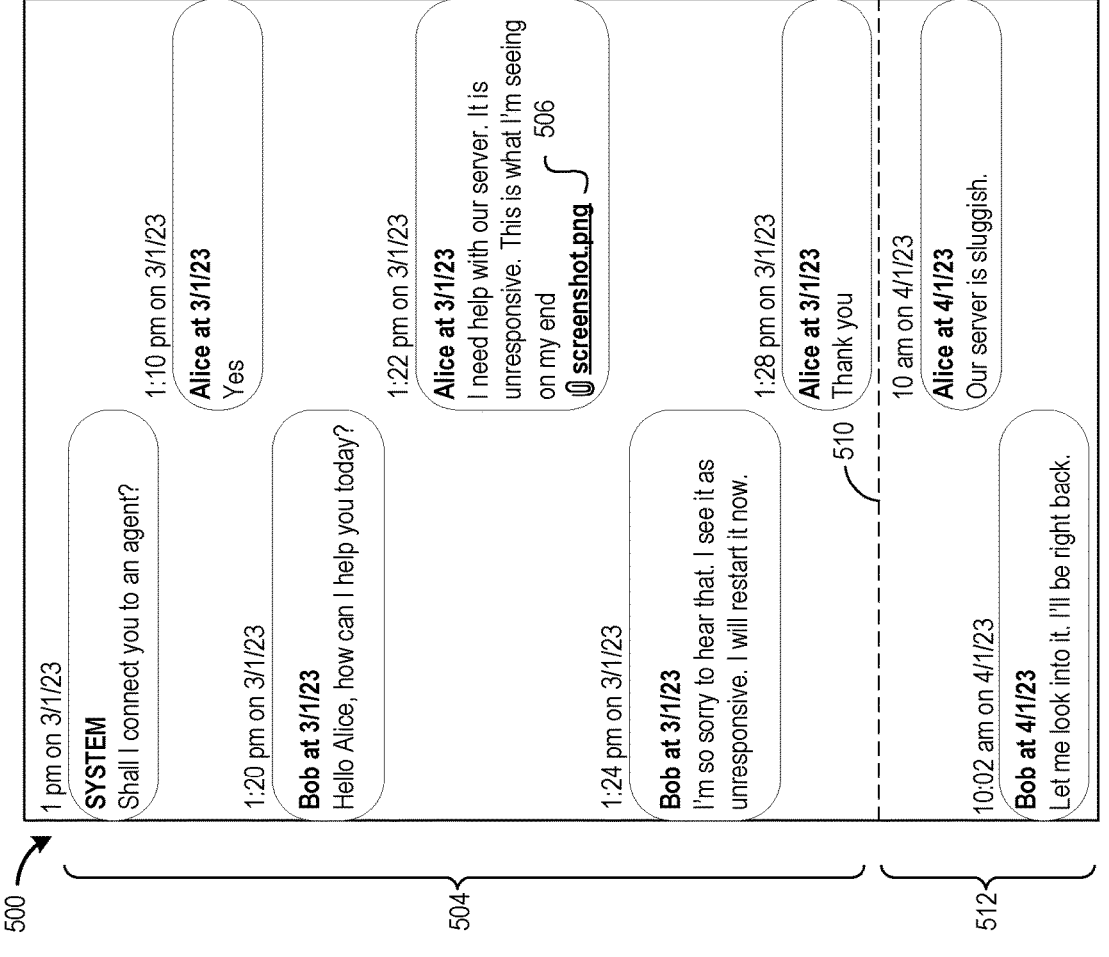
Figure 5C:
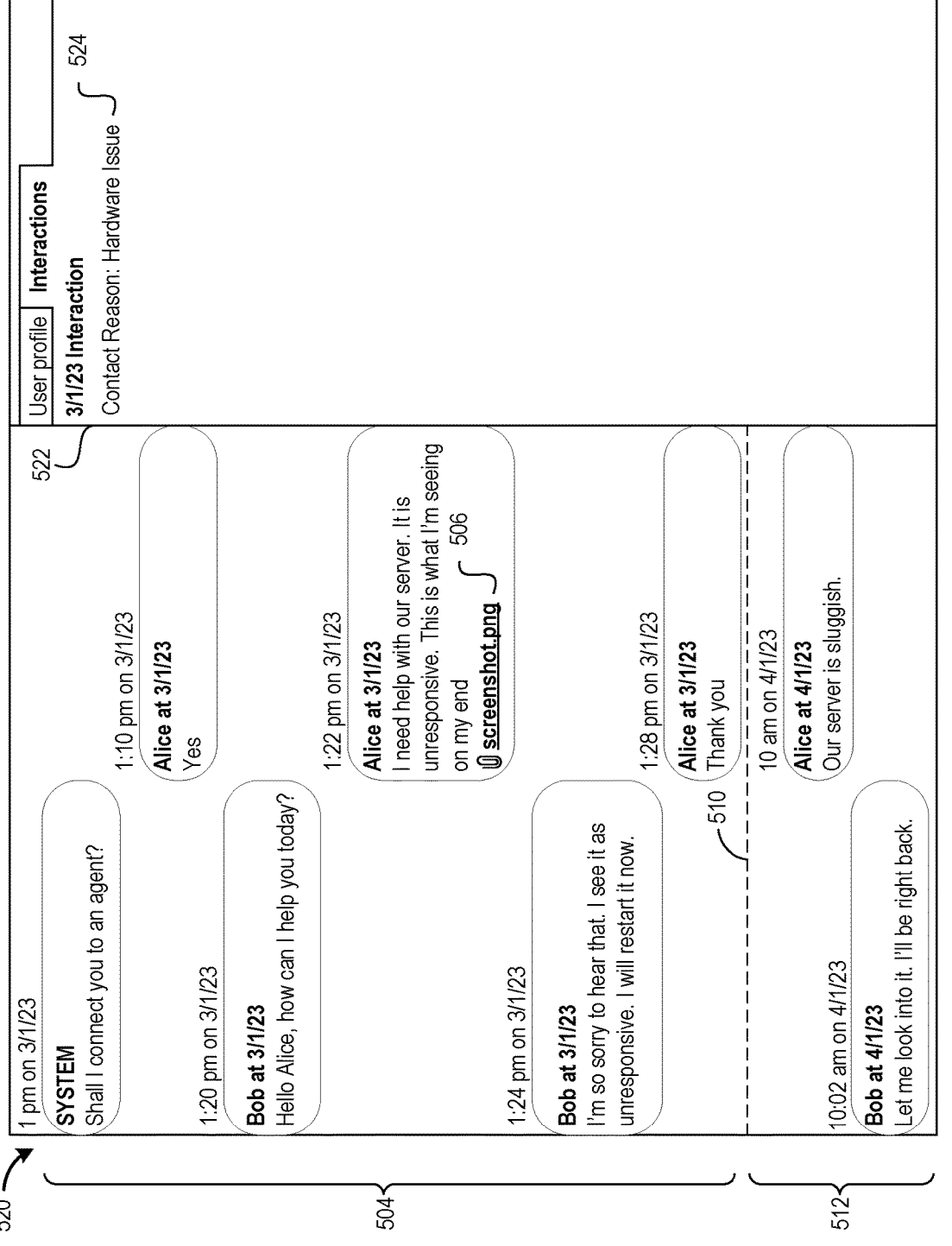

FIGS. 5A-5C depict illustrative communication graphical user interfaces. The communication graphical user interfaces can show the user experience that results from dynamic linking of interactions. When linked, the transcripts associated with the interactions can advantageously be continuously presented to the user. As described herein, the linked interactions can provide a user with useful information related to their current conversation while omitting other information that may not be relevant to their current conversation.

In FIG. 5A, a communication graphical user interface 500 is depicted. The communication graphical user interface 500 can be presented on a user computing device 102A. A user (Alice) can initiate the communication session 502 with an agent (Bob). As shown, the user can upload a supplemental data item 506, which can be a document attachment such as a screenshot of the user's computer screen. The user-agent interaction system 104 and/or the user facing system 150 can save the communication session 502 in the data storage 152 as a transcript. The user-agent interaction system 104 and/or the user facing system 150 can save the supplemental data item 506. In some embodiments, the user-agent interaction system 104 and/or the user facing system 150 can save the supplemental data item 506 with the transcript.

In FIG. 5B, the communication graphical user interface 500 is further depicted. As shown, the user can return to the conversation later (here a month later) and initiate a new communication session 512. However, to the user, the communication graphical user interface 500 can present the previous transcript 504 as a continuous communication session with the current communication session 512. Also as shown, the communication graphical user interface 500 can present the supplemental data item 506 associated with the previous transcript 504. The broken line 510 may not be shown to the user, but instead is shown here to distinguish between the previous transcript 504 and the current communication session 512. In some embodiments, the user and/or agent, can navigate (such as by scrolling) to yet further previous communication sessions, which can cause the user-agent interaction system 104 to load previous transcripts and present them in the communication graphical user interface 500. As described herein, the communication graphical user interface 500 can advantageously present any number of previous transcripts in a dynamic manner without time limitation.

In FIG. 5C, another communication graphical user interface 520 is depicted. The communication graphical user interface 520 can be presented on an agent computing device 102B. The communication graphical user interface 520 of FIG. 5C can be similar to the communication graphical user interface 500 of FIGS. 5A-5B. However, the communication graphical user interface 520 of FIG. 5C can further include an interactions panel 522. The interactions panel 522 can allow the agent to save supplemental data items associated with communication sessions, such as, but not limited to the supplemental data item 524, which can be an attribute (here a "Contact Reason" attribute) and attribute value (here a "Hardware Issue" value) for the interaction. As shown, the user-agent interaction system 104 can repopulate supplemental data items, such as the supplemental data item 524 in the communication graphical user interface 520 after loading the previous transcript 504 for the previous interaction. In some aspects, the communication graphical user interface 520 can repopulate supplemental data items associated with previous interactions, which can advantageously allow the agent to review information from previous conversations and improve the user-agent experience. For example, since the agent can have the previous conversations and information available, then the agent may not need to re-ask questions that have been previously answered.

Figure 6:
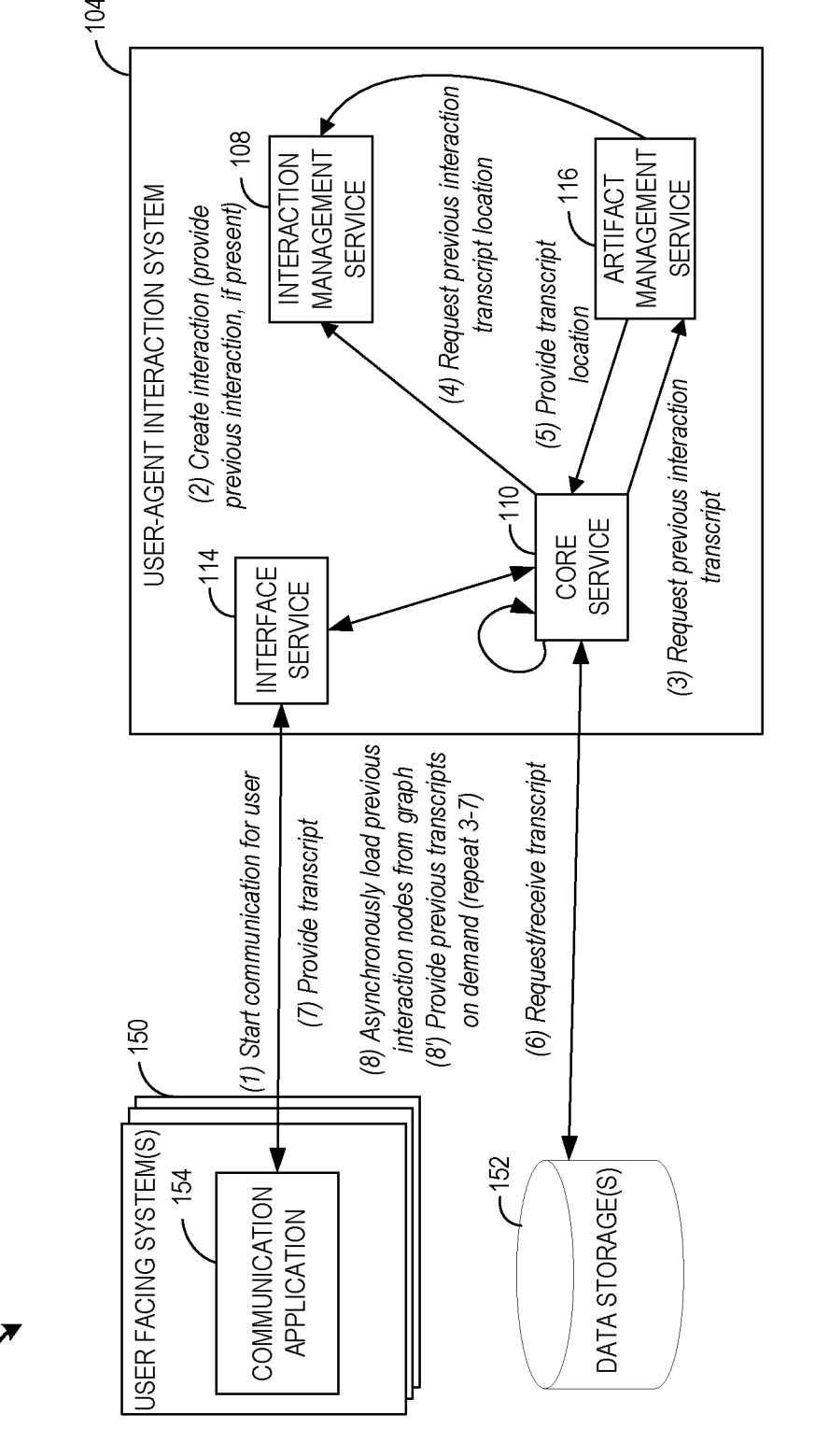
FIG. 6 is a flow diagram depicting illustrative interactions of a user-agent interaction system.

With reference to FIG. 6, in some embodiments, illustrative interactions one (1) through eight-prime (8') are depicted regarding the user-agent interaction system 104 and managing interactions and transcripts. The interactions one (1) through eight-prime (8') as shown and described can illustrate how components of the user-agent interaction system 104 can implement dynamic linking of interactions that can be out of chronological order. Moreover, the interactions one (1) through eight-prime (8') as shown and described can illustrate how transcripts can be dynamically loaded on-demand to efficiently provide a seamless user experience. The environment 600 of FIG. 6 can include the user-agent interaction system 104 and the user facing system 150. Some components of the environment 100 of FIG. 1 may implement some of the depicted interactions in FIG. 6. Other interactions (not illustrated) may be possible in accordance with the present disclosure in other embodiments. Similar to the communication depictions of FIG. 1, not every possible communication may be depicted in FIG. 6.

The interactions of FIG. 6 begin at one (1), where a communication can be started. A user can, via the communication application 154, begin a communication session with an agent. The communication application 154 can begin an interaction by sending a request to the interface service 114. In some embodiments, the communication application 154 can send and receive messages to the user-agent interaction system 104 using an API.

At two (2), the core service 110 can cause the interaction management service 108 to create an interaction. The interaction can be for the current communication session between the user and the agent. The core service 110 can provide a previous interaction (which can be represented with an identifier) to the interaction management service 108. As described herein, the provided interaction can be an immediately preceding interaction or another type of previous interaction, such as the initial interaction.

At three (3), the core service 110 can request the artifact management service 116 to load the transcript for a previous interaction if one exists. As described herein, as a user interacts with the graphical user interface of the communication application 154 that interaction can cause the core service 110 to request a previous transcript if one exists. In some embodiments, the artifact management service 116 can eager load additional transcripts of previous interactions (which can be based on a configurable number) to have the transcripts ready if they are requested by the communication application 154. At four (4), the artifact management service 116 can request the location for the previous interaction's transcript from the interaction management service 108. In some embodiments, the location can be a uniform resource identifier, such as a uniform resource locator. As described herein, transcripts can be from multiple different communication platforms. At five (5), the artifact management service 116 can provide the location to the core service 110. At six (6), the core service 110 can request and receive the transcript from the data storage 152. At seven (7), the interface service 114 can provide the transcript to the communication application 154. If there are supplemental data items, the interface service 114 can provide the supplemental data items to the communication application 154. The communication application 154 can cause presentation of the transcript in a communication graphical user interface as if the transcript were part of the same communication session, thereby giving the appearance of a "never ending" communication session. Accordingly, the interactions three (3) through seven (7) can specifically be responsible for dynamic on-demand loading of a transcript to efficiently provide a seamless user experience.

At eight (8), the core service 110 can load previous interactions from the graph of the interaction model. In some embodiments, the core service 110 can asynchronously load previous interactions. The core service 110 can request previous interactions from the interaction management service 108. The core service 110 can request previous interactions up to a configurable number, which can be a form of eager loading. At eight-prime (8'), the interface service 114 can provide previous transcripts on demand. The user-agent interaction system 104 can repeat three (3) through seven (7) as needed. As described herein, as a user interacts with the communication graphical user interface (such as by navigating in the graphical user interface), the communication application 154 can dynamically request previous transcripts from the interface service 114.

Figure 7:
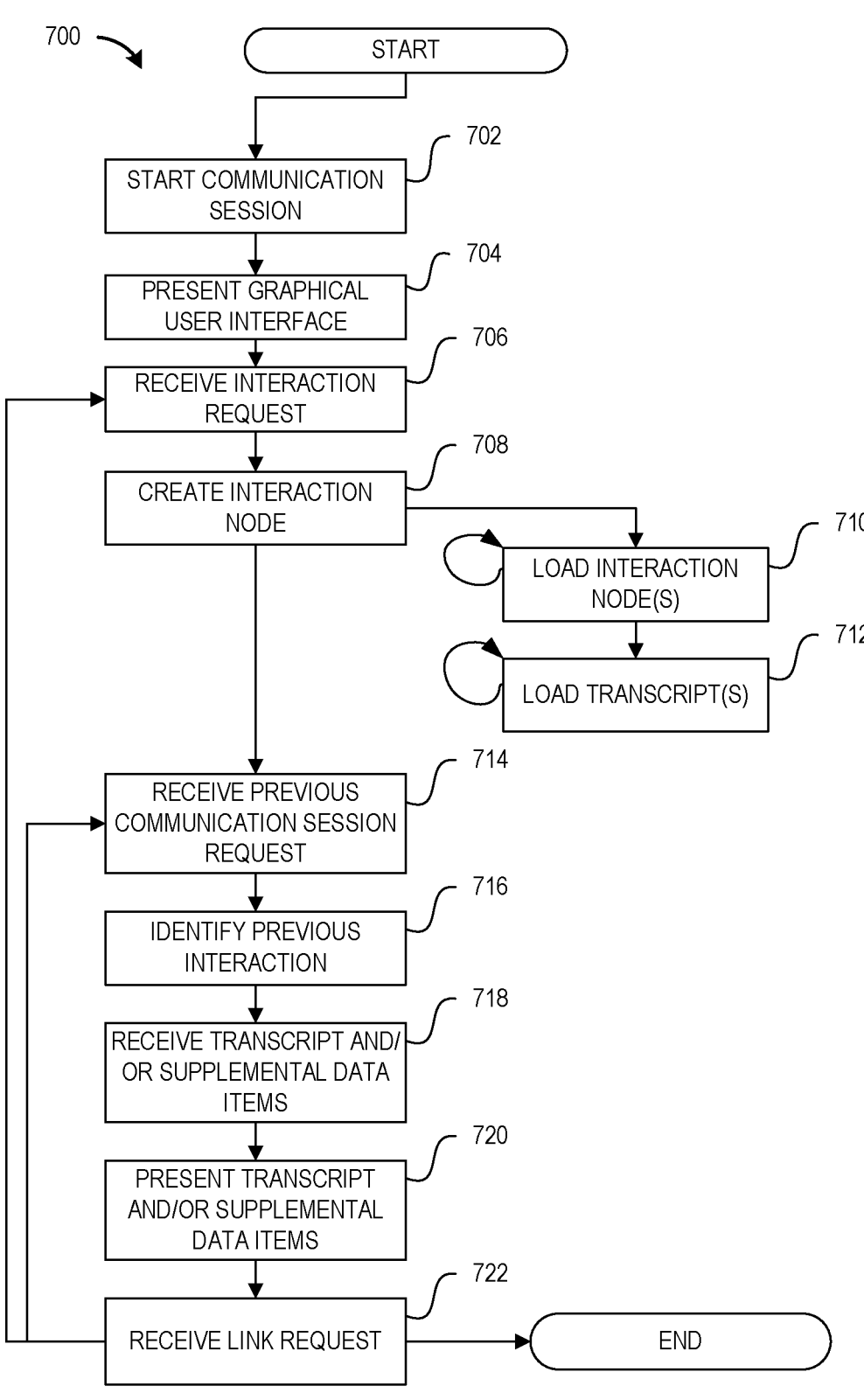
FIG. 7 is a flow chart depicting a method implemented by the user-agent interaction system for enabling persistent communication sessions.

FIG. 7 includes a flow diagram depicting a method 700 implemented by the user-agent interaction system 104 and/or the user facing system 150 for enabling persistent communication sessions. The method 700 can allow dynamic linking of backend interaction nodes, which can be out of chronological order. The dynamic linking of backend interaction nodes can enable a seamless presentation of transcripts between user profiles and agent profiles. The method 700 can further enable linking of backend interaction nodes after those nodes have been created and their respective conversations have already ended. As described herein, the linked interactions can be specifically selected to have significant relevance to user profiles. Thus, the method 700 can enable presentation of multiple transcripts to user profiles in a seamless manner that is relevant to the user profiles while specifically omitting other interactions that may have occurred but that may have little relevance to the user profiles.

As described herein, the user-agent interaction system 104 may be implemented with the computing system 201. In some embodiments, the computing system 201 may include the core application 222, the interaction management application 224, the interface application 226, and/or the artifact management application 228 each of which may implement aspects of the method 700. Some aspects of the method 700 may be implemented by the servers of the user-agent interaction system 104, which may implement the core service 110, the artifact management service 116, the interaction management service 108, and/or the interface service 114. Moreover, some aspects of the method 700 may be described above with respect to FIG. 6.

Beginning at block 702, a communication session can be started 702. A user can interact with the communication application 154 to request to contact an agent. The communication application 154 can start the communication session. As described herein, the communication session can be, but is not limited to, a text-based interaction, such as chat, or a voice-based interaction. The communication application 154 can connect the user with an agent.

At block 704, a graphical user interface can be presented. The communication application 154 can cause presentation of a graphical user interface on the user computing device 102A and/or the agent computing device 102B. The graphical user interface can cause presentation of a current communication session between the user profile and the agent profile. The graphical user interface can present text from a participant, such as the user and/or the agent. The text can be a conversation between the user and the agent. The communication application 154 can cause presentation, in the graphical user interface, of text data received from a user computing device 102A associated with the user profile. The communication application 154 can cause presentation, in the graphical user interface, of text data received from an agent computing device 102B associated with the agent profile. The participant can interact with the graphical user interface. A participant can submit input via the graphical user interface that can be presented as text in the graphical user interface. A participant can upload documents, such as a document attachment, which can be represented in the graphical user interface. Additional details regarding presentation of graphical user interfaces are described herein, such as with respect to FIGS. 5A-5C.

At block 706, an interaction request can be received. The communication application 154 can indicate to the core service 110 that an interaction between a user and an agent has been started, which can cause the core service 110 to create an interaction. In some embodiments, the communication application 154 in communication with the user-agent interaction system 104 can specify previous interaction(s) associated with the current interaction. The core service 110 can receive a request to create a new interaction between a user profile and an agent profile. The request can include a selection of a particular previous interaction among multiple different previous interactions. The selection can include previous interaction identifier. As described herein, in other embodiments, the previous interaction(s) can be specified after a communication session has been started. As described herein, the communication application 154 can communicate with the user-agent interaction system 104 using an API. A non-limiting message between the communication application 154 and the user-agent interaction system 104 to begin an interaction is shown below in Table 1.

TABLE 1

```
1    PUT /interaction HTTP/1.1
2    Content-type: application/json
3    {
```

TABLE 1-continued

```
4        "Attributes": {
5           "string" : "string"
6        },
7        "InteractionFlowId": "string",
8        "InitialMessage": {
9           "Content": "string",
10          "ContentType": "string"
11       },
12       "InstanceId": "string",
13       ... // other fields
14
15       "PersistentCommunication":{
16          "PreviousInteractionId":"11111111-aaaa"
17          "RehydrationType":"ENTIRE_PAST_SESSION"
18       }
19   }
```

The message of Table 1 can be in a JavaScript Object Notation (JSON) data format. Any other data format can be used. The user facing system 150 can specify that the interaction should be a persistent communication session. At lines 15-16 of Table 1, the user facing system 150 can provide parameters indicating a persistent communication type and the previous interaction (here a previous interaction identifier "11111111-aaaa" is used). Rehydration can refer to the process by which previous interactions and associated data are loaded during a current communication session. At line 17 of Table 1, the user facing system 150 can also provide a type of rehydration. The rehydration type can be an "ENTIRE_PAST_SESSION" rehydration type. In some embodiments, the previous interaction identifier can identify an initial interaction and the user-agent interaction system 104 can rehydrate starting from the initial interaction and proceeding up until the current interaction. In some embodiments, Table 2 below can illustrate another type of rehydration.

TABLE 2

```
1    PUT /interaction HTTP/1.1
2    Content-type: application/json
3    {
4        "Attributes": {
5           "string" : "string"
6        },
7        "InteractionFlowId": "string",
8        "InitialMessage": {
9           "Content": "string",
10          "ContentType": "string"
11       },
12       "InstanceId": "string",
13       ... // other fields
14
15       "PersistentCommunication":{
16          "PreviousInteractionId":"11111111-bbbb"
17          "RehydrationType":"FROM_SEGMENT"
18       }
19   }
```

The message of Table 2 can be similar to the message of Table 1. However, at line 17 of Table 2, the user facing system 150 can also provide a "FROM_SEGMENT" type of rehydration. In some embodiments, the previous interaction identifier can identify the immediately preceding interaction that should precede the current interaction and the user-agent interaction system 104 can rehydrate starting from the specified interaction and working backwards as necessary. In some embodiments, the user facing system 150 can include logic or rules to identify interactions that should not be included in persistent communications. The user facing system 150 can determine the interaction types of interactions and exclude some interactions where the interaction types are not an approved interaction type. For example, the user facing system 150 could exclude interactions that are of a survey type of interaction, such that users would not see their past surveys in persistent communications. Surveys can be provided to users after conversing with an agent. Accordingly, the user-agent interaction system 104 can advantageously provide a flexible persistent communication system that allows user facing system(s) 150 to design their persistent communications. Instead of interaction types, the user facing system 150 could use other criteria to determine previous interactions, such as by using attributes and attribute values to determine which interactions to link together. The user facing system 150 can send a request to create an interaction corresponding to the current communication session, which can include an identifier for the determined previous interaction.

At block 708, a new interaction node can be created. The interaction management service 108 can create a new interaction, which can be a new interaction node. The interaction management service 108 can add a link to the new interaction node and a previous interaction node associated with the previous interaction identifier. As described herein, the nodes and their links can be in a graph. The interaction management service 108 can add a link to the new interaction node and a previous interaction node identified by the previous interaction identifier. As described herein, the previous interaction identifier can indicate the immediately preceding interaction (discussed herein as a FROM_SEG-MENT rehydration) or an initial interaction that leads up until the current interaction node (discussed herein as an ENTIRE_PAST_SESSION rehydration). The interaction management service 108 can identify an initial interaction node identified by the previous interaction identifier. The interaction management service 108 can identify a farthest interaction node linked to the initial interaction node. In some embodiments, the interaction management service 108 can use a pagination model to determine the "last" interaction node associated with the initial interaction node. The interaction management service 108 can add a link to the new interaction node and the farthest interaction node. As described herein, the interaction nodes can be linked in a graph. In some embodiments, each interaction node can be immutable. Moreover, the user-agent interaction system 104 can add new links between immutable nodes. Additional details regarding nodes and graphs are described herein, such as with respect to FIG. 4.

At block 710, zero or more interaction nodes can be loaded. In some embodiments, the core service 110 can asynchronously load interaction nodes that are associated with the current interaction node. The core service 110 can load a threshold number of previous nodes linked to the new interaction node. The core service 110 can eager load a number of previous nodes until some threshold is satisfied (such as one hundred nodes) in anticipation for future requests. In some embodiments, as the core service loads interaction nodes, the core service 110 can load supplemental data items, such as attributes and attribute values, associated with those interaction nodes.

At block 712, zero or more transcripts can be loaded. In some embodiments, the core service 110 can asynchronously load transcripts that are associated with the current interaction node. The core service 110 can load a threshold number of transcripts associated with previous nodes linked to the new interaction node. The core service 110 can load a number of previous transcripts until some threshold is satisfied (such as one hundred transcripts) in anticipation for future requests.

At block 714, a previous communication session request can be received. The interface service 114 can receive, via a graphical user interface, a request for a previous communication session associated with the current communication session. As described herein, the communication application 154 can receive, via the graphical user interface, a user interaction input indicating a navigation change with respect to presented text in the graphical user interface. The navigation change can cause the communication application 154 to request a previous communication session.

At block 716, a previous interaction can be identified. The core service 110 can identify a previous interaction associated with the current communication session. In some cases, the core service 110 can identify a previous interaction associated with a new interaction. The core service 110 can identify a previous interaction associated with the previous interaction identifier. In some embodiments, the user-agent interaction system 104 can implement a pagination model, such that, from a current interaction node, the system 104 can request a next or previous node (depending on the implementation), which can return the previous interaction node. The core service 110 can traverse a link from the new interaction node to the previous interaction node and select the previous interaction node. In some embodiments, the core service 110 can traverse a link from the loaded interaction nodes described above at block 710 for loading interaction nodes. Specifically, the core service 110 can traverse the link from a current interaction node to a previous interaction node. In some cases, the previous interaction node can be a node that was identified with ENTIRE_PAST_SESSION rehydration where the farthest interaction node was linked to the new interaction node.

At block 718, a transcript and/or supplemental data items can be received. The core service 110 can receive a transcript associated with the previous interaction. The core service 110 can request a transcript location from the artifact management service 116, which can in turn request the location from the interaction management service 108. The interaction management service 108 can provide the location of a transcript, such as the specific data storage 152 that stores the transcript. As described herein, in some embodiments, the user-agent interaction system 104 can integrate with multiple channels and transcripts can be stored in different data storages 152. The current communication session between the user profile and the agent profile can be a text-based communication session, such as chat. A previous transcript can be a transcript of a voice-based audio recording, thereby combining communications from different modalities. The core service 110 can request and receive the transcript from the data storage 152 using the transcript location, which can be a URI in some embodiments. In some cases, if the transcript has already been loaded, the core service 110 does not need to request the transcript from the data storage 152. The core service 110 can select the transcript from the loaded transcripts discussed above at block 712 for loading transcripts. Accordingly, blocks 714, 716, 718 for receiving a request, identifying a previous transcript, and receiving the previous transcript can enable dynamic on-demand loading of a transcript to efficiently provide a seamless user experience.

In some embodiments, the communication application 154 can request the transcript. The communication application 154 can call an API to request the transcript. The API call can include a pagination token, which uses the value returned previously in the next subsequent request to retrieve the next set of results. Thus, the communication application 154 can continuously retrieve the next transcript in the interaction chain.

The core service 110 can identify a supplemental data item associated with the previous interaction. In some embodiments, the supplemental data item can include, but is not limited to, (i) a document attachment or (ii) an attribute and attribute value. Similar to a transcript location, the core service 110 can request and receive a location for a document attachment, which can be stored in the data storage 152. In other embodiments, a document attachment can be stored with a transcript, and the document attachment can be returned with a transcript when a transcript is requested. With respect to attributes and attribute values associated with interactions, the core service 110 can request and receive any associated attributes and attribute values from the interaction storage 112. In some embodiments, attributes and attribute values can be added to interactions by agents, such as a "Contact Reason" attribute and a "Hardware Issue" attribute value. The core service 110 can provide the transcript and/or supplemental data items to the communication application 154.

At block 720, the transcript and/or supplemental data items can be presented. The communication application 154 can cause presentation of a transcript in a graphical user interface. The communication application 154 can link text from the transcript to text from the current communication session for presentation as a continuous session. As described herein, to a user it can look as if the user has had one long communication session, when in fact the user-agent interaction system 104 manages the transcripts and links them together as described herein. The communication application 154 can cause presentation of supplemental data items in the graphical user interface. Supplemental data items, such as document attachments, can be presented to user profiles. Other supplemental data items, such as attributes and attribute values, can be presented in a graphical user interface to the agent profiles since they are intended for agents. The communication application 154 can cause presentation of a graphical user interface for an agent computing device or a user computing device that includes (i) text from the transcript combined with text from the current communication session, and (ii) the supplemental data item.

At block 722, a request to link two or more interactions can be received. In some embodiments, the core service 110 can receive a request to link a new interaction to a particular previous interaction among several different previous interactions. As described herein, the communication application 154 can request that a new interaction be linked to a previous interaction after a new interaction has been created. The request to link two or more interactions can be similar to the request to create a new interaction in that they both specify one or more previous interactions. The block 722 for linking any two or more interactions after they have been created and that can be out of order can advantageously allow omission of other interactions that may have occurred but that may have little relevance to the user profile. As described herein, the linked interactions can be specifically selected to have significant relevance to the user profile.

As shown, additional previous communication requests at block 714 can be received and the user-agent interaction system 104 can respond to those requests in a loop with the subsequent blocks 716, 718, 720, 722. For example, as a user navigates within the graphical user interface (such as by scrolling), the user interactions can trigger requests for previous transcripts that can be provided by the user-agent interaction system 104. Moreover, if a user is transferred to a new agent or the particular communication session ends, new interaction requests can be received at block 706 and the user-agent interaction system 104 can respond to those requests in a loop with the subsequent blocks 706, 708, 714, 716, 718, 720, 722. Following end of a communication session, the user facing system 150 can store a corresponding transcript and cause the user-agent interaction system 104 to store an association between the transcript and a respective interaction.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could." "might" or "may." unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising." "including." "having." and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied. The term "substantially" when used in conjunction with the term "real time" can refer to speeds in which no or little delay occurs.

Disjunctive language such as the phrase "at least one of X, Y, or Z," unless specifically stated otherwise, is otherwise understood with the context as used in general to present that an item, term, etc., may be either X. Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   receiving a first request to create a new interaction between a user profile and an agent profile;
   causing presentation, in a first graphical user interface, of a current communication session between the user profile and the agent profile;

causing presentation, in the first graphical user interface, of text data received from an agent computing device associated with the agent profile;
   receiving a second request to link the new interaction to a previous interaction, wherein the second request comprises a selection of a previous interaction among a plurality of previous interactions;
   in response to receiving the second request,
      creating a new interaction node, and
      adding a link to the new interaction node and a previous interaction node for the previous interaction, wherein a graph comprises the link, the new interaction node, and the previous interaction node;
   receiving, via the first graphical user interface, a request for a previous communication session associated with the current communication session;
   loading a threshold number of a plurality of previous nodes linked to the new interaction node;
   identifying the previous interaction node associated with the new interaction node based at least in part on the link, wherein identifying the previous interaction node further comprises:
      traversing the link within the plurality of previous nodes from the new interaction node to the previous interaction node; and
      selecting the previous interaction node from the plurality of previous nodes;
   receiving a transcript associated with the previous interaction node; and
   causing presentation, in the first graphical user interface, of the transcript, wherein causing presentation of the transcript further comprises:
      linking text from the transcript to text from the current communication session for presentation as a continuous session, wherein presentation of the continuous session comprises presentation, in a same graphical user interface chat window, of the text from the transcript in a continuous stream from the text from the current communication session.

2. The computer-implemented method of claim 1, wherein the selection of the previous interaction comprises a previous interaction identifier, wherein adding the link comprises:
   adding the link to the new interaction node and the previous interaction node identified by the previous interaction identifier.

3. The computer-implemented method of claim 1, wherein receiving the request for the previous communication session further comprises:
   receiving, via the first graphical user interface, user interaction input indicating a navigation change with respect to presented text in the first graphical user interface.

4. The computer-implemented method of claim 1 further comprising:
   identifying a supplemental data item associated with the previous interaction; and
   causing presentation, in a second graphical user interface of the agent computing device, of:
      (i) text from the transcript combined with text from the current communication session, and
      (ii) the supplemental data item.

5. The computer-implemented method of claim 4, wherein the supplemental data item comprises (i) a document attachment or (ii) an attribute and attribute value.

6. A system comprising:
   a data storage medium to store computer-executable instructions; and a computer hardware processor in communication with the data storage medium, wherein the computer hardware processor executes the computer-executable instructions to at least:

receive a request to create a new interaction between a user profile and an agent profile;

cause presentation, in a graphical user interface, of a current communication session between the user profile and the agent profile;

receive a request to link the new interaction to a previous interaction among a group of previous interactions;

receive, via the graphical user interface, a request for a previous communication session associated with the current communication session;

load a first threshold number of a plurality of previous interactions associated with the new interaction;

load a second threshold number of a plurality of transcripts, wherein each transcript from the plurality of transcripts is associated with an interaction from the plurality of previous interactions;

select a previous transcript from the plurality of transcripts; and cause presentation, in the graphical user interface, of the previous transcript, wherein to cause presentation of the previous transcript, the computer hardware processor executes the computer-executable instructions to at least:

link text from the previous transcript to text from the current communication session for presentation as a continuous session, wherein presentation of the continuous session comprises presentation, in a same graphical user interface chat window, of the text from the previous transcript in a continuous stream from the text from the current communication session.

7. The system of claim 6, wherein the request to link the new interaction to the previous interaction comprises a previous interaction identifier, and wherein the computer hardware processor executes additional computer-executable instructions to at least:

create a new interaction node, and add a first link to (i) a previous interaction node associated with the previous interaction identifier and (ii) the new interaction node, wherein a graph comprises the first link, the previous interaction node, and the new interaction node.

8. The system of claim 6, wherein the computer hardware processor executes additional computer-executable instructions to at least:

determine a first interaction type for a first interaction;

determine that the first interaction type is not an approved previous interaction type;

determine a second interaction type for the previous interaction;

determine that the second interaction type is an approved previous interaction type; and send the request to link the new interaction to the previous interaction, wherein the request to link comprises an identifier for the previous interaction.

9. The system of claim 8, wherein the first interaction type is a survey type of interaction.

10. The system of claim 6, wherein the current communication session between the user profile and the agent profile is a text-based communication session, and wherein the previous transcript is a transcript of a voice-based audio recording.

11. A system comprising:

a data storage medium to store computer-executable instructions; and a computer hardware processor in communication with the data storage medium, wherein the computer hardware processor executes the computer-executable instructions to at least:

receive a request to create a new interaction between a user profile and an agent profile;

cause presentation, in a first graphical user interface, of a current communication session between the user profile and the agent profile;

receive a request to link the new interaction to a first previous interaction among a plurality of previous interactions, wherein the request to link the new interaction to the first previous interaction comprises a previous interaction identifier;

create a new interaction node;

identify an initial interaction node identified by the previous interaction identifier;

identify a farthest interaction node linked to the initial interaction node;

add a link to the new interaction node and the farthest interaction node, wherein a graph comprises the new interaction node, the farthest interaction node, and the link;

receive, via the first graphical user interface, a request for a previous communication session associated with the current communication session;

identify a second previous interaction associated with the new interaction;

receive a previous transcript associated with the second previous interaction; and cause presentation, in the first graphical user interface, of the previous transcript, wherein to cause presentation of the previous transcript, the computer hardware processor executes the computer-executable instructions to at least:

link text from the previous transcript to text from the current communication session for presentation as a continuous session, wherein presentation as the continuous session comprises presentation, in a same graphical user interface chat window, of the text from the previous transcript in a continuous stream from the text from the current communication session.

12. The system of claim 11, wherein the computer hardware processor executes additional computer-executable instructions to at least:

cause presentation, in the first graphical user interface, of first text data received from a user computing device associated with the user profile; and cause presentation, in the first graphical user interface, of second text data received from an agent computing device associated with the agent profile.

13. The system of claim 11, wherein to identify the second previous interaction, the computer hardware processor executes further computer-executable instructions to:

traverse the link from the new interaction node to the farthest interaction node.

14. The system of claim 11, wherein the computer hardware processor executes further computer-executable instructions to at least:

load a threshold number of a plurality of previous nodes linked to the new interaction node, wherein to identify the second previous interaction, the computer hardware processor executes the further computer-executable instructions to:

traverse the link within the plurality of previous nodes from the new interaction node to the farthest interaction node; and select the farthest interaction node from the plurality of previous nodes.

15. The system of claim 11, wherein the computer hardware processor executes further computer-executable instructions to at least:

load a first threshold number of a plurality of previous nodes linked to the new interaction node; and load a second threshold number of a plurality of transcripts, wherein each transcript from the plurality of transcripts is associated with a node from the plurality of previous nodes, wherein to identify the previous transcript, the computer hardware processor executes the further computer-executable instructions to:

select the previous transcript from the plurality of transcripts.

16. The system of claim 11, wherein the computer hardware processor executes additional computer-executable instructions to at least:

determine a first interaction type for a first interaction;

determine that the first interaction type is not an approved previous interaction type;

determine a second interaction type for the first previous interaction; and determine that the second interaction type is an approved previous interaction type, wherein the first previous interaction is the second previous interaction.

* * * * *